(No Model.)
D. J. & H. D. GUE.
BICYCLE BRAKE.
No. 594,688. Patented Nov. 30, 1897.
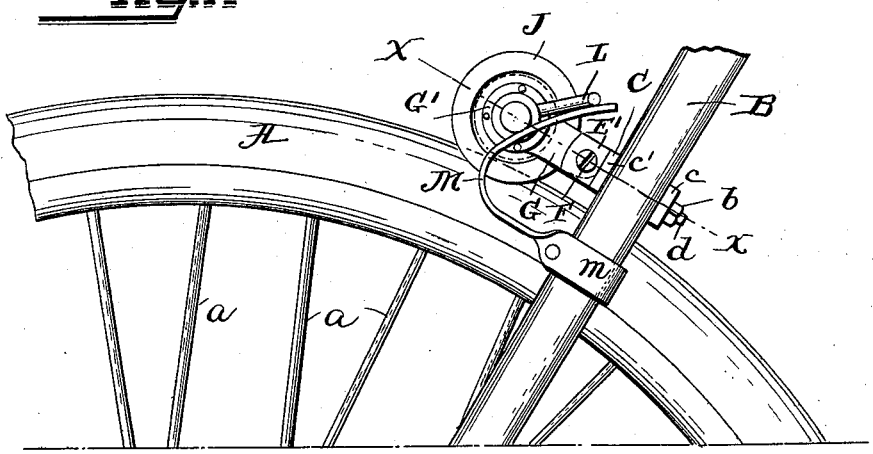
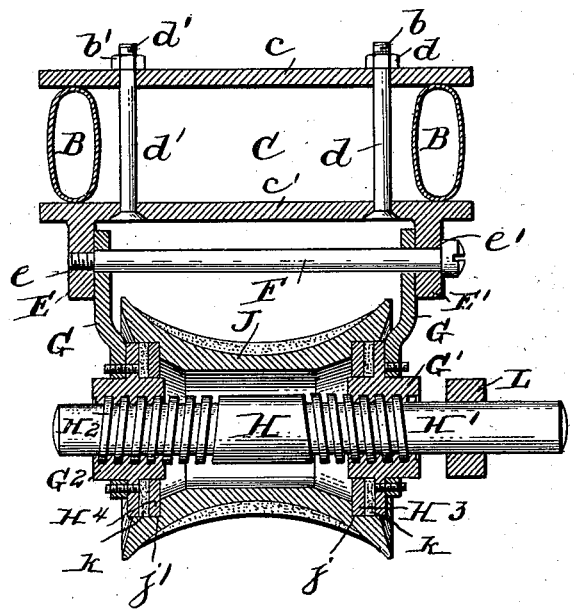
Witnesses.
Jesse B. Heller
Carol H. Deshong
Inventors
David J. Gue
Harry D. Gue
Attorney.
THE NORRIS PETERS CO., PHOTO-LITHO., WASHINGTON, D. C.

UNITED STATES PATENT OFFICE.

DAVID J. GUE AND HARRY D. GUE, OF BROOKLYN, NEW YORK.

BICYCLE-BRAKE.

SPECIFICATION forming part of Letters Patent No. 594,688, dated November 30, 1897.

Application filed July 25, 1896. Serial No. 600,474. (No model.)

*To all whom it may concern:*

Be it known that we, DAVID J. GUE and HARRY D. GUE, citizens of the United States, residing at Brooklyn, county of Kings, and State of New York, have invented a new and useful Improvement in Braking Devices, of which the following is a full, clear, and exact description, reference being had to the accompanying drawings, which form a part of this specification.

Speaking generally, our braking device consists, essentially, of the following: Instead of applying to the revolving surface or wheel to be braked a fixed brake block or shoe or braking device which by the friction of the revolving surface or wheel upon the fixed surface decreases the speed of the wheel to be braked we form our braking device revoluble and provide means for braking, bringing this revoluble braking device to and from contact with the wheel to be braked. We further provide means whereby the revolution of this revoluble device may itself be resistant, and by the resistance which we apply to this revoluble braking device we provide the friction to cause the wheel to be braked. This revoluble device is preferably never retarded to such an extent as to prevent its revolution. We thus provide a revolving braking device which greatly decreases the wear upon the periphery of the wheel to be braked.

We have illustrated our device as applied to a bicycle and for the purpose of braking the front wheel thereof, for which purpose it is especially adapted, although we do not intend to limit ourselves to any specific application or use.

In the drawings, Figure 1 is a side elevation of the brake and part of a bicycle; and Fig. 2 is a section on the line $x$ $x$, Fig. 1.

A represents the tire of the wheel, and $a$ the spokes.

B is the fork.

C is a clamp which consists of the two members $c$ and $c'$. The member $c'$ has fixedly secured to it the bolts $d$ and $d'$. These bolts pass through the member $c$ and at that end are threaded, and upon the threaded ends work the nuts $b$ and $b'$, respectively, by means of which the movable member may be moved to and from the fixed member, and between these two members $c$ and $c'$ the fork B may be clamped. Projecting from the member $c'$ are the lugs E and E', provided with orifices $e$ and $e'$, respectively. Through these orifices project the rod F, secured in position by the thread end working in one of the orifices. Pivoted to the rod F are the arms G. Secured to the end of these arms G are the threaded nuts G' and G².

H is a shaft having the threaded portions H' and H², the portion H² working in the threaded nut G² and the threaded portion H' in the threaded nut G'. Loosely mounted upon a shoulder on the nuts H' and H² are the friction-disks H³ and H⁴. Between the disks H³ and H⁴ is a grooved roller J. This grooved roller is provided with shoulders $j$ and $j'$, which rest, respectively, upon the friction-disks H³ and H⁴. Between the face of the disks and the face of the nuts, on each side, are placed washers of leather or some other more or less compressible material, which are marked in the drawings $k$, the object being to increase the angle through which the worm must turn before backing the spool. Under normal conditions the disks are out of contact with the face of the wheel and the leather washers are out of contact with the face of the disks, and when the shaft is rotated the nuts are brought toward each other and force the washer against the face of the disks and the disk against the face of the roller, thus retarding the revolution of the roller. This movement of the disk is given by the following means: Secured to the shaft is the crank L. M is a spring secured to the yoke by the clip $m$. This spring rests against the crank L and normally holds the crank and with it the shaft and with it the wheel J out of contact with the tire A.

When it is desired to apply the brake to the wheel, the rider places his feet upon the crank L, compresses the spring M, forcing the wheel J into contact with the tire A, and this same movement turns the shaft H and causes, through the threaded portions H' and H², the nuts G' and G² to move toward each other, causing the washer $k$ to force the disks H³ and H⁴ against the inner surface of the wheel J, retarding its motion. In the absence of the disks H³ and H⁴ the same result may be accomplished by forcing the washers directly against the faces of the wheel J, as in either case the friction takes place against one or both surfaces of the washers. The movement of the crank L, necessary to compress the spring and bring the roller J in contact with the wheel, is sufficient to force the disks into such contact with the surface or face of the wheel J as to retard its movement considerably, and yet not sufficient to stop its rotation entirely. The tire A then is brought into frictional contact with the rolling-surface, the resistance to rotation of which is greater than the resistance of rotation of the wheel to be braked, and as a consequence the speed of rotation of the wheel to be braked is diminished by a rolling friction instead of as in the ordinary case by means of rotation against a fixed non-revoluble surface. As soon as the foot is removed the spring M at once goes into action and returns and forces the crank in the opposite direction and raises the shaft, and with it the wheel J, out of contact with the tire A.

We do not intend to limit ourselves to the mechanism above described, as our invention can be carried out with the mechanism varied to a considerable extent.

Having now fully described our invention, what we claim, and desire to protect by Letters Patent, is—

1. In a braking device, in combination, a shaft, a wheel loose upon said shaft, said shaft having oppositely-threaded ends, and friction-disks working upon said threaded end and adapted, in the oscillation of the shaft, to be brought against and from the surface of the wheel.

2. In a braking device, in combination, a shaft, a wheel loose upon said shaft, said shaft having oppositely-threaded ends, and friction-disks working upon said threaded end and adapted in the oscillation of the shaft to be brought against and from the surface of the wheel, and means to oscillate said shaft.

3. In a braking device, in combination, a shaft, a wheel loose upon said shaft, said shaft having oppositely-threaded ends, and friction-disks working upon said threaded end and adapted in the oscillation of the shaft to be brought against and from the surface of the wheel, and means to oscillate said shaft, and means to normally hold said braking device free from the mechanism to be braked.

4. In a braking device, in combination, a shaft, a wheel loose upon said shaft, said shaft having oppositely-threaded ends, and friction-disks working upon said threaded end and adapted in the oscillation of the shaft to be brought against and from the surface of the wheel, and means to move said braking device to and from the mechanism to be braked, and means to oscillate said shaft to move said disks in contact with the wheel, said last-mentioned means acting simultaneously with the movement of the device to the mechanism to be braked.

In testimony of which invention we have hereunto set our hands.

DAVID J. GUE.
HARRY D. GUE.

Witnesses:
R. B. FITHIAN,
G. C. HENRY.